(12) United States Patent
Bailly

(10) Patent No.: US 8,190,649 B2
(45) Date of Patent: May 29, 2012

(54) RANKING AND CLUSTERING OF GEO-LOCATED OBJECTS

(75) Inventor: Olivier Bailly, Oakland, CA (US)

(73) Assignee: Google Inc., Mountain View, CA (US)

( * ) Notice: Subject to any disclaimer, the term of this patent is extended or adjusted under 35 U.S.C. 154(b) by 521 days.

(21) Appl. No.: 11/740,210

(22) Filed: Apr. 25, 2007

(65) Prior Publication Data

US 2007/0250477 A1    Oct. 25, 2007

Related U.S. Application Data

(60) Provisional application No. 60/794,752, filed on Apr. 25, 2006.

(51) Int. Cl.
G06F 17/30 (2006.01)
(52) U.S. Cl. .......................... 707/797; 707/803
(58) Field of Classification Search .................. 707/797, 707/803
See application file for complete search history.

(56) References Cited

U.S. PATENT DOCUMENTS

| | | | |
|---|---|---|---|
| 6,470,344 B1 * | 10/2002 | Kothuri et al. | 707/100 |
| 6,678,692 B1 * | 1/2004 | Hyatt | 707/102 |
| 2004/0024779 A1 * | 2/2004 | Perry et al. | 707/104.1 |
| 2004/0243553 A1 * | 12/2004 | Bailey | 707/3 |
| 2004/0243571 A1 * | 12/2004 | Judd | 707/3 |
| 2008/0270435 A1 * | 10/2008 | Furusho | 707/101 |

OTHER PUBLICATIONS

Garcia-Molina H et al., "Database Systems: The complete Book". 2002, Prentice Hall, XP002480555, pp. 666-667; 690-696.
Lo C.P. et al., "Concepts and techniques of Geographic Information Systems Passage". 2002, Prentice Hall, US, XP002480556, pp. 245-248.
Finkel R.A. et al., "Quad Trees a Data Structure for Retrieval on Composite Keys", Acta Informatica, Springer verlag, DE, vol. 4 No. 1, Jan. 1, 1974, pp. 1-09.

* cited by examiner

*Primary Examiner* — Son T Hoang
(74) *Attorney, Agent, or Firm* — Fish & Richardson P.C.

(57) ABSTRACT

A method of updating information stored in an index associated with spatially-related objects. The method includes accessing a hierarchical multi-level index having leaf nodes containing information about an object and non-leaf nodes storing information about a number of nodes related to the non-leaf nodes, adding a representation of the object at a leaf node in the index, and traversing parents of the leaf node toward a root node, and incrementing counts of each node in the traversal path.

22 Claims, 3 Drawing Sheets

RANKING AND CLUSTERING OF GEO-LOCATED OBJECTS

CROSS REFERENCE TO RELATED APPLICATIONS

This application claims priority under 35 USC §119(e) to U.S. Patent Application Ser. No. 60/794,752, filed on Apr. 25, 2006, the entire contents of which are hereby incorporated by reference.

TECHNICAL FIELD

This invention relates to data storage in distributed systems, and more particularly to databases for geographic information systems.

BACKGROUND

Geographic information systems (GIS) permit for the archiving, retrieving, and manipulation of data that has been stored and indexed according to the geographic coordinates of its elements.

GIS systems can provide particular challenges for proper database design. That is because GIS information does not fit nicely into a single data type that can be stored in one type of flat-file or relational database. Rather, GIS systems often involve use a variety of data types, such as imagery, maps, and tables. GIS systems may also be very large, such as when they cover a large area and include expansive amounts of information about various points in an area, or cover a very large area like the entire world. Addressing, topographical, or demographic data for various areas may be stored, and may be fairly large to store. In addition, GIS systems that provide graphical representations of data (such as on a map or a 3D representation of the globe) have even more challenges in organizing data, and storing massive amounts of data. Graphical data, such as 3D structures to be placed on a geographic representation, such as on Google Maps or Google Earth, may be especially large and unwieldy.

When many different pieces of data are stored for a large area, and those pieces themselves are large, it can be a real challenge to organize, update, and search the data, and to present it quickly and accurately to users of a system.

SUMMARY

This document describes systems and methods for storing and accessing geo-located content, such as 3D content to be displayed on a model of the earth. The content is stored in a multi-level hierarchical index having embedded therein information about descendants at each level of the index. Such an arrangement of data may permit for quick retrieval of items even as the number of stored items increases to a large number. In addition, the index structure can generally be updated dynamically as objects are added, without the need for timely rebalancing of the index tree, as may be required with other indexing approaches.

The described systems and methods, in particular implementations, may provide for one or more of the following features and/or advantages. Users of a system may benefit by being able to quickly and conveniently locate objects associated with a very large geography such as the earth, and within a very large database of objects. The system may permit, for example, bounding box queries in lat/lng space (generated by a graphical interface such as Google Earth or Google Maps), and may also prevent showing too many items, such as when a user is viewing a very large geography (such as an entire country). The system may also permit for the ranking of items so as to show them in a preferred order.

Geographic information providers may benefit by being able to more easily store information about geo-located objects, and may be able to readily search for and recall such objects for display with a related geographic area. In addition, the system may permit for dynamic updates to the index without requiring a rebuild of the index, in certain implementations. Moreover, the data may be stored in a relatively compact form.

In one implementation, a method of updating information stored in an index associated with spatially-related objects is disclosed. The method comprises accessing a hierarchical multi-level index having leaf nodes containing information about an object and non-leaf nodes storing information about a number of nodes related to the non-leaf nodes, adding a representation of the object at a leaf node in the index, and traversing parents of the leaf node toward a root node, and incrementing counts of each node in the traversal path. The incrementing the count of a parent may comprise creating a parent node and setting its count to a primary value. In addition, the multi-level index may be in the form of a quadtree structure, and the information about an object may comprise a pointer to an identifier for a geo-located 3D model.

In some implementations, the leaf nodes may represent distinct geographical areas, and a geographical area encompassing the earth's surface may be represented in under twenty levels of nodes.

In yet another aspect, a method of searching for geo-located information is disclosed. The method comprises receiving a representation of a geographic search area, determining a level of a hierarchical multi-level index containing geo-related information to review, traversing levels in the index to a maximum lookup level to locate objects at levels in the index, and returning information relating to some of the objects located at levels in the index. The representation of a geographic search area may comprise a bounding box, and the information relating to the objects may be stored at leaf nodes in the index.

In some implementations, the method may further comprise scoring the information relating to objects located at the levels in the index, and returning the information in an order related to the object scores. In addition, the method may further comprise excluded information relating to objects from the returned information if the related object scores are too low.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
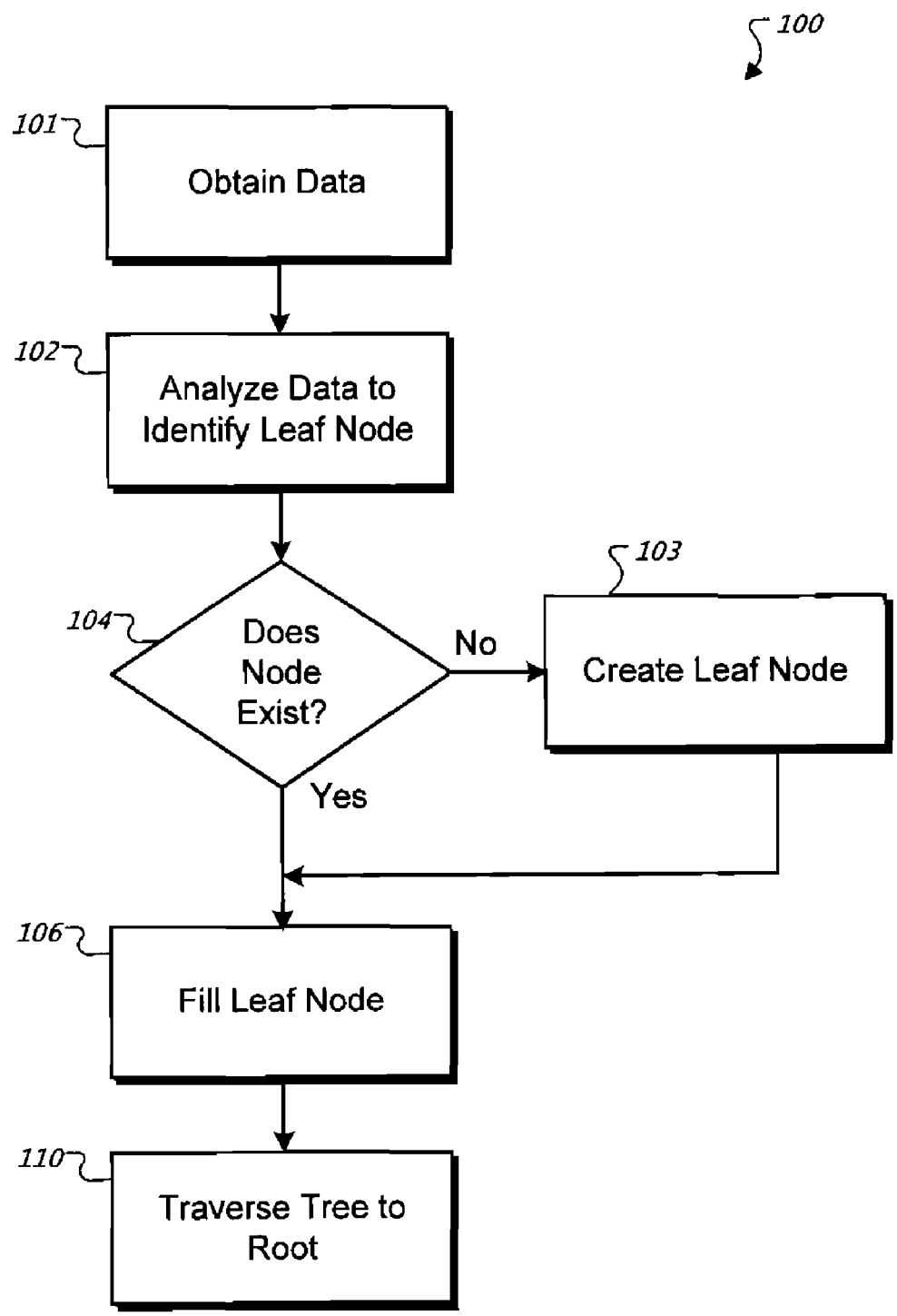
FIG. 1 is a flow chart showing the steps of an insertion mechanism used when objects are added to an index.

In the database implementation described here, a quadtree data structure using two distinct node types may be employed. A quadtree structure is generally a tree data structure in which each internal node has up to four children. A quadtree structure may be used, for example, to repeatedly subdivide space into quadrants. The structure has two distinct node types: leaf nodes and grid (or non-leaf) nodes. The leaf nodes are located at the bottom level (max_level) of the structure, and contain data entries (i.e., geo-located data) to be found in a bounding box associated with that node. Grid nodes lie at levels 0 to max_level-1, and contain the total number of data entries in all leaf nodes descendant of the node.

The earth is represented using latitude/longitude space. At the top level in the index (i.e., level 0), a single grid node (root node) covers the entire space (i.e., (−180,−90) to (180,90)), using the longitude/latitude coordinate system. At each level, the space is divided into 2level cells ($2^{level}$), and uses a row/column coordinate system in that division at that level. Across the entire grid, a unique coordinate system is then (row, column, level), where row and column are both in the interval [0, 2level-1]. The root node is thus at coordinates (0,0,0).

A compact representation of each node in this coordinate system can be fit on 64 bits, assuming there are no more than 31 levels, which should be more than sufficient (at level 31, each cell would cover an area of 360/231 degrees in longitude space, or ~1.67e-7 degrees, and 180/231 degrees in latitude, or ~8.31e-8 degrees). A maximum level of 15 is generally sufficient, and row and column can be compacted on 31 bits each, with level encoded by packing stop bits in this fashion as follows:

bits:|row|col|11|000000|
size:|l|1|2|62-2*l| where 'l' represents the level in the index. The two '11' bits after row and column are the stop bits, which permits access back and forth between row/col/level and this representation. This may be termed the CellId for a given node.

Going from parent to children consists of adding 1 to the level, multiplying the row and column by two to find the top/left children and adding 1 to both values for the bottom/right one. To go from a node to its parent, one simply needs to divide both the row and the column by 2 and decrement the level by 1, assuming the node level is strictly positive (i.e., the root node has no parent).

Using a compact representation of each node may permit for certain advantages, particularly where the model is very large. By nature, the further down one goes in the index, the sparser it should be. Memory usage could be prohibitive if data for each cell at each level is stored (at level 15, there are 4**15, or over 1 billion cells, so storing information for each of these cells may be unrealistic), so the system here may be established to only keep data for populated cells, which may be stored in a hash table.

The key of this hash table is the CellId of each node. The value type will depend on the node type: grid nodes demand an understanding of how many data entries are present in all leaf nodes covered by a particular leaf node. Therefore, one can simply store an integer quantity, which may represent a number of descendants, and an extent for the bounding box covered by data entries covered by the node. The combination of these two quantities may form an object collection. For leaf nodes, the system may need to store a list of data entries.

FIG. 1 is a flow chart 100 showing the steps of an insertion mechanism used when objects are added to an index. At act 102, the data is analyzed to identify a leaf node to contain the desired data entry. At act 104, it is determined whether that node exists; if it does exist, it is filled (act 106), and if it does not exist, it is created (act 108) and then filled (act 106). The tree is then traversed from the leaf node up to the root node—creating new nodes where they do not yet exist, and increasing the count of any descendant nodes by one (act 110).

Figure 2:
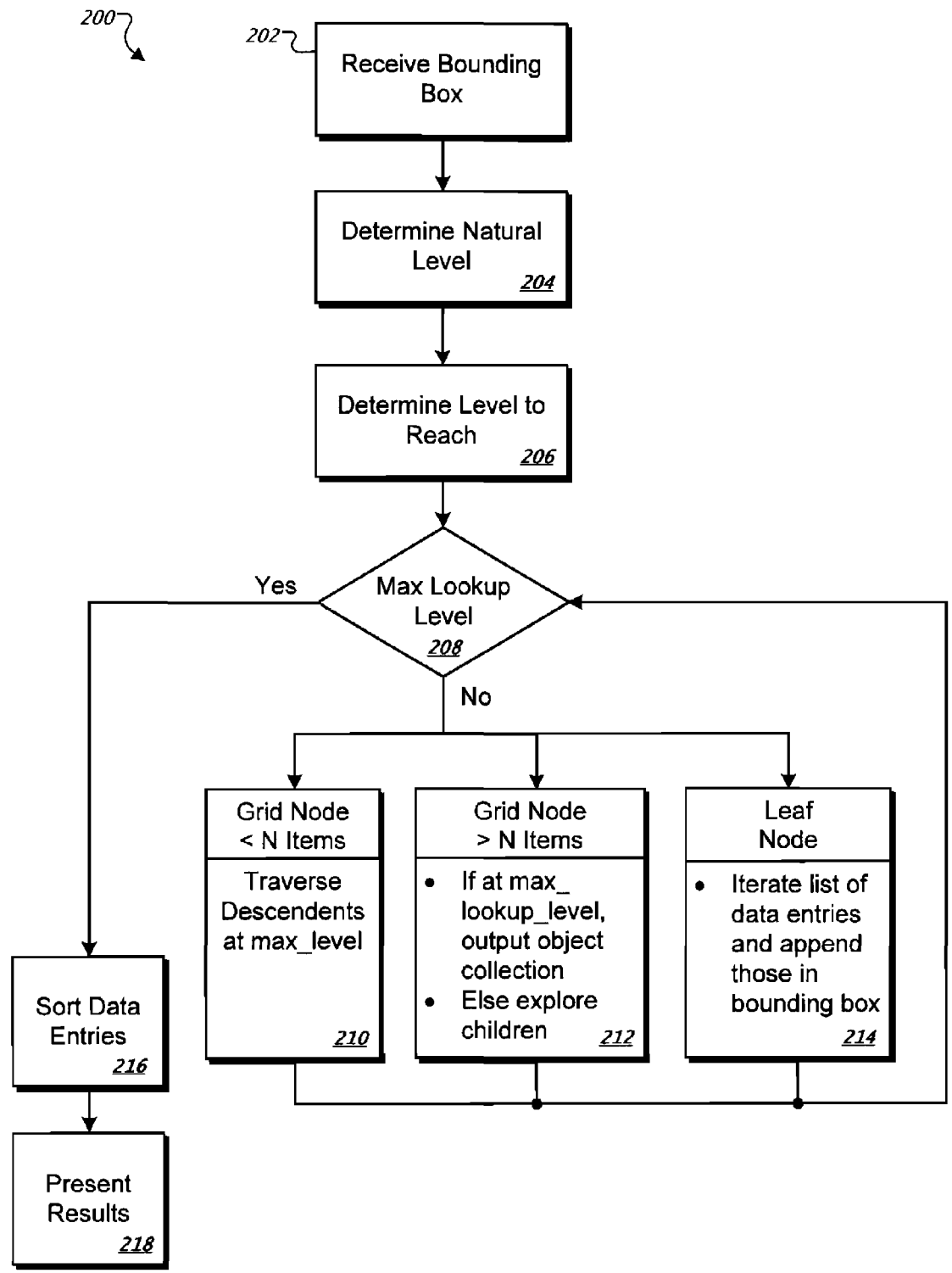
FIG. 2 is a flow chart showing steps for searching within a quadtree data structure.

FIG. 2 is a flow chart 200 showing steps for searching within a quadtree data structure. A bounding box is initially received that covers a lat/lng space (act 202). A result for the search may consist of two parts: a list of data entries, and a list of object collections. Data entries represent single data points, while object collections represent clusters of objects.

At act 204, a natural level in an index is determined for the bounding box, e.g., a level at which the bounding box contains at most 2 cells in each dimension (row and column). Taking the first cell which completely contains the bounding box causes problems at certain boundaries, e.g., around the point at 0,0. If a query bounding box spans both north, west, south and east of that point, only a root node contains that box entirely, and having to reach all the way up to root level could yield wrong results. By taking a small square in a grid rather than a single cell, one finds the level in the index which contains cells which are comparable in size to the query bounding box and thus may minimize the number of cells to explore in the index.

At act 206, a determination is made of which maximum level to reach down to (typically, four levels down from the level calculated above, but not more than max_level): max_lookup_level For each traversed node(act 208):
  if it is a grid node which contains fewer than N items (where N is the maximum number of items to output at max_lookup_level), directly reach down to descendants at max_level for this node and traverse them. There can be no more than N such nodes (act 210).
  if it is a grid node which contains more than N items (act 212):
    if the process is at max_lookup_level, output the object collection for this node to result.
    otherwise, explore children of this node
  if it is a leaf node, iterate the list of data entries and append those which fall into the query bounding box to the result (act 214).

When the nodes are completed, the data entries in the result may be scored (based, e.g., on popularity, last modification, or other user controlled parameters) (act 216), and the most relevant ones may be output to limit the size of the output (act 218).

This design may imply that a query run at a sufficiently high zoom level will cause only data points to be emitted, e.g., if the level for a query bounding box reaches max_level. Performance of this approach is generally independent of the number of items in the data set or the size of the query bounding box. For any query, a finite number of cells will be explored, which is controlled by N and the number of levels one wants to reach down to. Adding more data to the data set will result in more object collections being returned as results and will require a user to zoom closer to see actual data points but not impact performance of the system.

Figure 3:
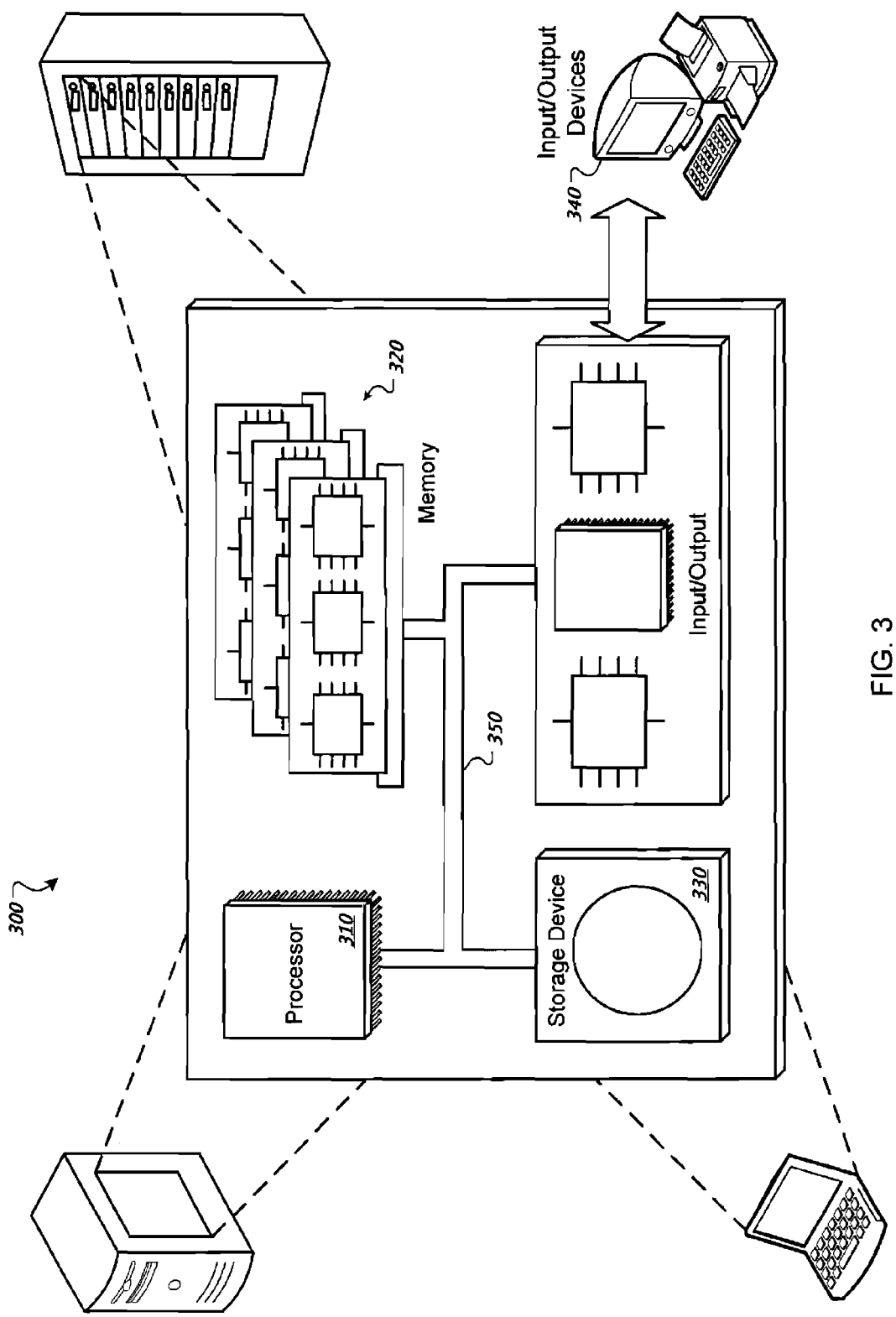
FIG. 3 is a schematic diagram showing components in a computer system suitable to be used with the systems and methods described in this document.

FIG. 3 is a schematic diagram showing components in a computer system suitable to be used with the systems and methods described in this document. The system 400 includes a processor 410, a memory 420, a storage device 430, and an input/output device 440. Each of the components 410, 420, 430, and 440 are interconnected using a system bus 450. The processor 410 is capable of processing instructions for execution within the system 2300. In one implementation, the processor 410 is a single-threaded processor. In another implementation, the processor 410 is a multi-threaded processor.

The processor 410 is capable of processing instructions stored in the memory 420 or on the storage device 430 to display graphical information for a user interface on the input/output device 440.

The memory 420 stores information within the system 2300. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 2300. In one implementation, the storage device 430 is a computer-readable medium. In various different implementations, the storage device 430 may be a floppy disk device, a hard disk device, an optical disk device, or a tape device.

The input/output device 440 provides input/output operations for the system 2300. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of updating information associated with spatially-related models, comprising:
    accessing, by one or more computer processors, a hierarchical multi-level index in a form of a quadtree structure having leaf nodes containing the information about a spatially-related model and non-leaf nodes storing other information about nodes related to the non-leaf nodes, wherein particular levels in the index are made up of nodes that represent geographic sub-quadrants of corresponding parent nodes in adjacent levels in the index;
    adding, by the one or more computer processors, the information about the spatially-related model at a leaf node in the index; and
    traversing, by the one or more computer processors, parent nodes of the leaf node toward a root node, and incrementing counts of nodes in a traversal path, wherein
    the leaf nodes and the non-leaf nodes in the index are in a coordinate system represented by a notation of (row, column, level), and
    traversing between the adjacent levels in the index comprises adding 1 to a current level, and multiplying a current position of each row and column by 2, wherein the current level and the current position are variables of a pointer in the index.

2. The method of claim 1, wherein the incrementing counts comprises creating a parent node and setting its count to a primary value.

3. The method of claim 1, wherein the information about the spatially-related model comprises the pointer to an identifier for a geo-located three-dimensional model of an item to be placed on a globe model.

4. The method of claim 1, wherein the leaf nodes represent distinct geographical areas, and a root node that is an ancestor of the leaf nodes represents all of the earth's surface.

5. The method of claim 4, wherein a geographical area encompassing the earth's surface is represented in under twenty levels of nodes, wherein each level contains nodes that each represents a sub-quadrant from a node at a next-adjacent parent level.

6. The method of claim 1, wherein traversing from a first corner of a quadrant to an opposite corner comprises adding 1 to the current position of each of the row and the column.

7. The method of claim 1, wherein the row and column are each constrained to a range of $[0, 2^{level-1}]$.

8. The method of claim 1, wherein the notation is capable of representing all of the earth, with 64 bits, with areas defined as low as 1.67e-7 degrees in longitude and 8.31e-8 degrees in latitude.

9. A computer-implemented method of searching for geo-located information, comprising:
  receiving, by one or more computer processors, a representation of a geographic search area;
  determining, by the one or more computer processors, a level of a hierarchical multi-level index in a form of a quadtree structure containing the geo-related information to review, wherein particular levels in the index are made up of nodes that represent geographic sub-quadrants of corresponding parent nodes in adjacent levels in the index;
  traversing, by the one or more computer processors, all levels in the index to a maximum lookup level to locate object information in the index; and
  returning, by the one or more computer processors, at least some of the object information located in the index, wherein
  the leaf nodes and the non-leaf nodes in the index are in a coordinate system represented by a notation of (row, column, level), and
  traversing between the adjacent levels in the index comprises adding 1 to a current level, and multiplying a current position of each row and column by 2, wherein the current level and the current position are variables of a pointer in the index.

10. The method of claim 9, wherein the object information is associated with a geocoded model.

11. The method of claim 9, wherein the representation of the geographic search area comprises a bounding box, and parameters of the bounding box are received via input through a graphical user interface.

12. The method of claim 9, wherein the object information is stored at leaf nodes in the index.

13. The method of claim 9, further comprising scoring the at least some of the object information located in the index, and returning the scored object information in an order related to the scoring.

14. The method of claim 13, further comprising excluding information relating to objects from the returned object information when the scoring is below a determined threshold.

15. One or more non-transitory computer-readable storage media embodying computer program instructions thereon to perform operations comprising:
  accessing a hierarchical multi-level index in a form of a quadtree structure having leaf nodes containing the information about a spatially-related model and non-leaf nodes storing other information about nodes related to the non-leaf nodes, wherein particular levels in the index are made up of nodes that represent geographic sub-quadrants of corresponding parent nodes in adjacent levels in the index;
  adding the information about the spatially-related model at a leaf node in the index; and
  traversing parent nodes of the leaf node toward a root node, and incrementing counts of nodes in a traversal path, wherein
  the leaf nodes and the non-leaf nodes in the index are in a coordinate system represented by a notation of (row, column, level), and traversing between the adjacent levels in the index comprises adding 1 to a current level, and multiplying a current position of each row and column by 2, wherein the current level and the current position are variables of a pointer in the index.

16. The media of claim 15, wherein the leaf nodes represent distinct geographical areas, and a root node that is an ancestor of the leaf nodes represents all of the earth's surface.

17. The media of claim 16, wherein a geographical area encompassing the earth's surface is represented in under twenty levels of nodes, wherein each level contains nodes that each represents a sub-quadrant from a node at a next-adjacent parent level.

18. The media of claim 15, wherein traversing from a first corner of a quadrant to an opposite corner comprises adding 1 to the current position of each of the row and the column.

19. The media of claim 15, wherein the notation is capable of representing all of the earth, with 64 bits, with areas defined as low as about 1.67e-7 degrees in longitude and 8.31e-8 degrees in latitude.

20. One or more non-transitory computer-readable storage media embodying computer program instructions thereon to perform operations comprising:
  receiving a representation of a geographic search area;
  determining a level of a hierarchical multi-level index in a form of a quadtree structure containing the geo-related information to review, wherein particular levels in the index are made up of nodes that represent geographic sub-quadrants of corresponding parent nodes in adjacent levels in the index;
  traversing all levels in the index to a maximum lookup level to locate object information in the index; and
  returning at least some of the object information located in the index, wherein
  the leaf nodes and the non-leaf nodes in the index are in a coordinate system represented by a notation of (row, column, level), and
  traversing between the adjacent levels in the index comprises adding 1 to a current level, and multiplying a current position of each row and column by 2, wherein the current level and the current position are variables of a pointer in the index.

21. The media of claim 20, wherein the representation of a geographic search area comprises a bounding box, and parameters of the bounding box are received via input through a graphical user interface.

22. The media of claim 20, wherein the operations further comprise scoring the at least some of the object information located in the index, and returning the scored object information in an order related to the scoring.

* * * * *

UNITED STATES PATENT AND TRADEMARK OFFICE
CERTIFICATE OF CORRECTION

PATENT NO.          : 8,190,649 B2
APPLICATION NO.     : 11/740210
DATED               : May 29, 2012
INVENTOR(S)         : Olivier Bailly It is certified that error appears in the above-identified patent and that said Letters Patent is hereby corrected as shown below:

In the Claims:

Column 7, line 5, in Claim 6, delete "comer" and insert -- corner --, therefor.

Column 8, line 25, in Claim 18, delete "cormer" and insert -- corner --, therefor.

Signed and Sealed this
Eighteenth Day of December, 2012

David J. Kappos
*Director of the United States Patent and Trademark Office*